(No Model.) 2 Sheets—Sheet 1.
G. HAYES.
WHEEL FOR BICYCLES.
No. 593,653. Patented Nov. 16, 1897.
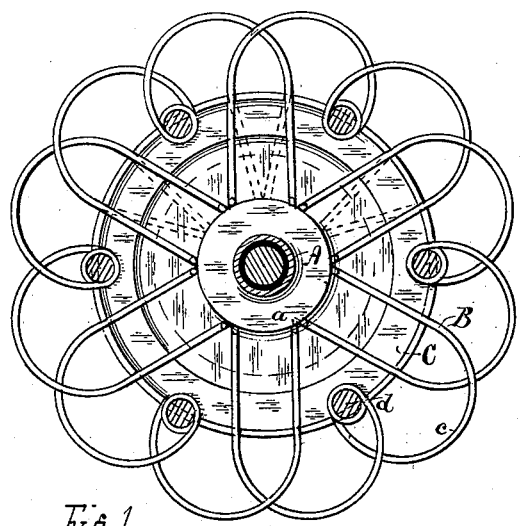
Fig.1.
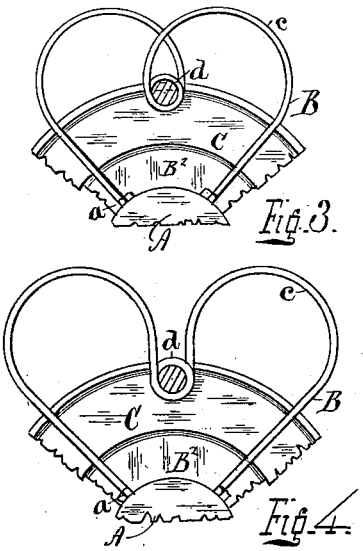
Fig.3.
Fig.4.
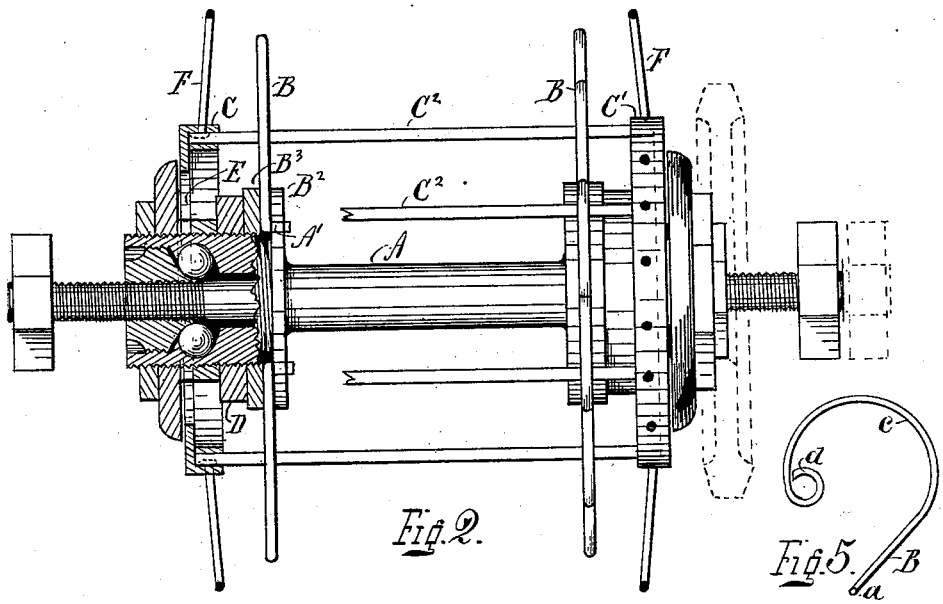
Fig.2.
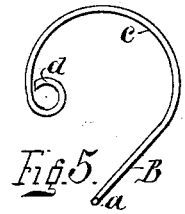
Fig.5.
Witnesses  
Arthur Hayes.  
Harry D. Black.
Inventor  
Geo Hayes.

(No Model.) 2 Sheets—Sheet 2.
G. HAYES.
WHEEL FOR BICYCLES.
No. 593,653. Patented Nov. 16, 1897.
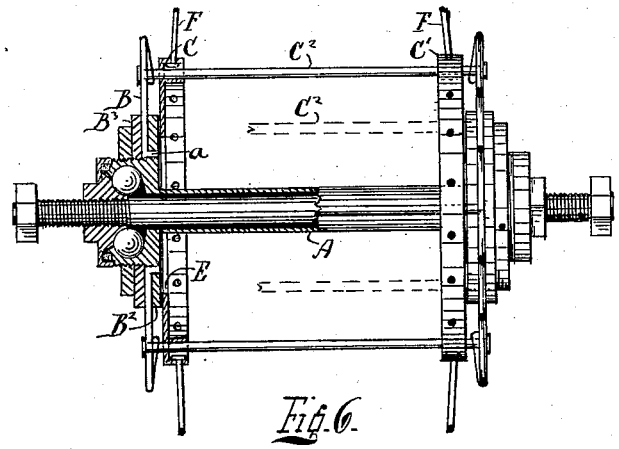
Fig. 6.
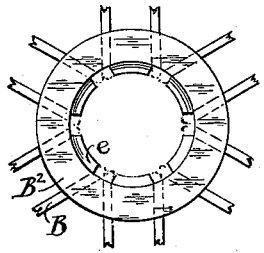
Fig. 7.
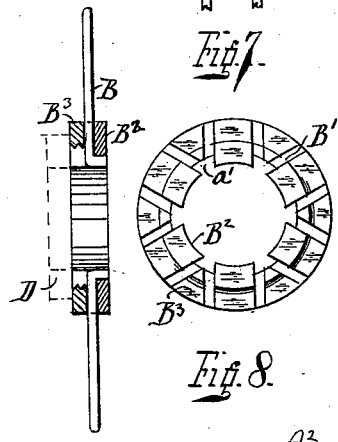
Fig. 8.
Fig. 9.
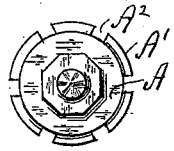
Fig. 10.
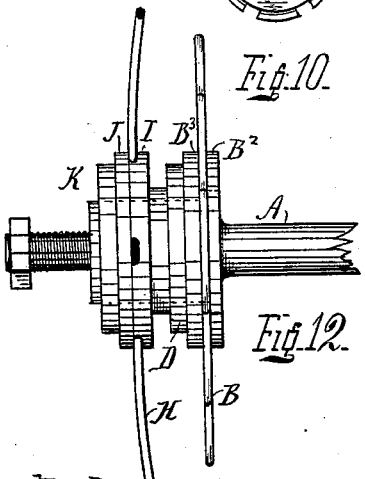
Fig. 11.   Fig. 12.
Witnesses
Arthur Hayes
Harry J. Black.
Inventor
Geo H Hayes.

UNITED STATES PATENT OFFICE.

GEORGE HAYES, OF NEW YORK, N. Y.

WHEEL FOR BICYCLES.

SPECIFICATION forming part of Letters Patent No. 593,653, dated November 16, 1897.

Application filed December 19, 1896. Serial No. 616,301. (No model.)

*To all whom it may concern:*

Be it known that I, GEORGE HAYES, a citizen of the United States, and a resident of the city, county, and State of New York, have invented certain Improvements in Wheels for Bicycles and other Vehicles, of which the following is a specification.

My invention relates to wheels in which elasticity and resiliency are derived from mechanism between the rim and axle-hub; and my improvements consist of a combination of an axle-hub with a separate annular spoke-nave effected by two sets of metal arc springs, one set to each face of the wheel encircling the axle-hub, secured thereto and also secured to the spoke-nave, both sets of springs being arranged to stand outwardly from the axle-hub parallel to the plane of the wheel and uncovered, the spoke-nave being constructed as two rings connected together by cross-rods serving as ties and braces, with the rigid spokes of the wheel secured thereto and extending therefrom, after the usual bicycle method, to the rim of the wheel and secured thereto, as usual, the spoke-nave encircling the axle-hub at sufficient distance therefrom to permit of an oscillatory or vibratory motion of the hub, which is suspended within the same by the suspensory arc springs which connect them, the object being to obtain all necessary resiliency without the employment of pneumatic tires.

My improvements further consist of a wheel in which a system of externally-located arc-shaped resilient springs, consisting of two sets, as hereinbefore mentioned, suspending the axle-hub within a spoke-nave, and a system of resilient spokes arranged between the axle-nave and rim of the wheel, secured to both, are combined to secure resiliency to the axle-hub, first, between it and the inner bearings of the rigid spokes, and, secondly, between it and the rim of the wheel; and my improvements further consist of the peculiar devices and combinations of devices specially formed, arranged, and adapted to effectuate the successful carrying out of the first-mentioned improvements, all as hereinafter more definitely described, and pointed out in the claims, reference being had to the accompanying drawings, in which—

Figure 1 represents a cross-section showing the encircling arc suspensory springs of one set. Fig. 2 represents a lengthwise view of the axle-hub, with one end in section and the other in elevation. Figs. 3, 4, and 5 are face elevations of arc suspensory springs alone to illustrate modifications. Fig. 6 is a view of an axle-hub after the manner of that of Fig. 2, illustrating a modification. Fig. 7 is an interior face elevation of the annular plate which when sleeved upon the axle-hub forms the foundation-support to which the stems of one set of arc suspensory springs are secured. Fig. 8 is an exterior face elevation of the annular foundation-plate of Fig. 7, showing grooves for the reception of suspensory arc springs. Fig. 9 is a cross-section of the annular foundation-plate of Figs. 7 and 8, with springs in position and the securing-ring or locking-nut in place, whereby they are held firmly and securely to the foundation-plate. Dotted lines show a nut which when threaded upon the hub secures the same to the axle-hub. Fig. 10 is an end elevation of the axle-hub, showing a flange thereto with openings therein for the reception of the hook ends of the suspensory arc springs after the annular plate of Figs. 7, 8, and 9 is placed thereto. Fig. 11 represents a face elevation of the wheel with arc suspensory springs and resilient spokes. Fig. 12 is an elevation of one end of the axle-hub as arranged for both suspensory arc springs and resilient spokes.

On the drawings, A indicates the axle-hub, through which the axle, which sustains or aids to sustain the vehicle to which the wheel is to be applied, passes. The axle-hub shown is of the usual ball-bearing variety peculiar to bicycles and similar vehicles. The hub near each end is formed with a moderately-projecting annular flange, as A', having notches made therein at intervals for reception of the hook ends of suspensory arc springs.

B indicates the suspensory arc springs, which, fitting into grooves B', formed in the exterior face of an annular foundation-plate B², are secured thereto by an annular ring or lock-nut B³, threaded upon an enlargement of plate B, securing them permanently thereto before placing upon the axle-hub.

The ends of the springs B are each formed with a turn, as a hook, (shown at *a*,) which passes through notches in plate B², provided for their reception, as at $a'$, and, when in place upon the axle-hub, through the notches corresponding therewith formed in flange A, as at $A^2$, Fig. 10. The annular plate $B^2$, with lock-nut $B^3$ and the suspensory springs B, form, when combined, a complete device which may be carried anywhere with impunity and applied to the hub at any time, which makes an especially useful arrangement to facilitate repairs. Upon the axle-hub the device is secured by nut D. $d$ indicates a coil therein, which may be made, if desirable, or dispensed with, to suit circumstances.

The plate B is formed with a recess, as at $e$, Fig. 7, to enable it to fit closely to and over flange A' of the axle-hub, as it is desirable that its interior face shall be flush with the interior face of the enlargement of the hub inclosing the ball-bearings.

The spoke-nave of the wheel to which the rigid tensional spokes are secured is formed of two rings C and C', one near each end of the axle-hub, connected together by cross-rods $C^2$, the spokes being attached to the rings and the cross-rods serving as ties and braces to hold the rings in proper position. The nave-rings encircle the axle-hub and are large enough in their inner periphery to provide space, as at E, between them and the axle-hub for the vibratory or oscillatory motion of the same.

The springs B are secured to the rings C and C', as in Figs. 1, 2, and 6, the cross-rods $C^2$ serving as pivots therefor, and the axle-hub becomes thereby suspended within the spoke-nave by the suspensory springs B.

F indicates the rigid tensional spokes of the wheel, their inner ends secured to the spoke-nave rings and their outer ends secured to the rim G of the wheel, after the usual bicycle manner, or otherwise. Thus the spoke-nave is held rigidly to its position.

The rim G may have any tire desirable, but as it is desirable to have all resiliency within the rim and dispense with pneumatic tires a steel or other hard tire is preferable to enable this wheel to perform effectually. Whenever it is desirable to augment or enlarge the amount of resiliency in the wheel, I add thereto a set of resilient spokes, secured to the axle-hub and rim of the wheel.

H indicates the resilient spokes, their ends hooked to an annular foundation-plate I and backed by an annular plate J, both of which are threaded or otherwise placed upon the axle-hub A and secured thereupon by a nut or its equivalent K, a suitable stop being provided to keep them at a suitable distance from the resilient arc springs B to prevent colliding therewith. By this means I resiliently sustain the axle-hub from the rim, as well as from the rigid spoke-bearings. This combination will be found useful in some cases, particularly in wheels of large diameter, as may be used in motor-carriages, where possibly a greater amount of resiliency may be demanded.

What I claim as new, and desire to secure by Letters Patent, is—

1. A wheel for bicycles and other vehicles, having a central axle-hub within the hollow of a special spoke-nave, the two connected together resiliently by two sets of arc suspensory springs, one set to each end of the axle-hub, both sets externally arranged, the springs standing out from the axle-hub transversely thereto, and each set constituting a congeric of arcs parallel to the plane of the wheel, essentially as set forth.

2. In a wheel for bicycles and other vehicles, a skeleton spoke-nave engaging the rigid spokes of the wheel, and formed as two rings connected together rigidly by cross rods or bars, and encircling the axle-hub of the wheel connected thereto by two sets of arc suspensory springs, externally located and arranged, essentially as set forth.

3. In a wheel for bicycles and other vehicles, two sets of arc suspensory springs, secured to and arranged around the axle-hub, one set at each end thereof, the springs extending outwardly therefrom parallel to the plane of the wheel and transversely to the axle-hub, the springs also secured to a spoke-nave encircling the axle-hub and not otherwise connected therewith, but held in tension rigidly by a set of rigid tensional spokes, secured thereto and to the rim of the wheel, essentially as set forth.

4. In a wheel for bicycles and other vehicles, a ring of arc suspensory springs externally arranged upon the axle-hub, each spring having ends held rigidly between two annular plates secured upon the axle-hub by nuts, whereby they are adapted for removal connectedly, the springs also connected to a rigidly-held spoke-nave and in conjunction with a corresponding set at the other end of the hub holding the axle-hub in suspension within the hollow of the spoke-nave, essentially as set forth.

GEO. HAYES.

Witnesses:
ARTHUR HAYES,
HARRY I. BLACK.